US008577591B2

(12) United States Patent
Schinerl

(10) Patent No.: US 8,577,591 B2
(45) Date of Patent: Nov. 5, 2013

(54) METHOD FOR PREVENTING A COLLISION BETWEEN A PART MOVABLE ALONG AN AXIS AND AN OBSTACLE

(75) Inventor: Christoph Schinerl, Weisskirchen (AT)

(73) Assignee: WFL Millturn Technologies GmbH & Co. KG., Linz (AT)

( * ) Notice: Subject to any disclaimer, the term of this patent is extended or adjusted under 35 U.S.C. 154(b) by 1198 days.

(21) Appl. No.: 11/662,566

(22) PCT Filed: Sep. 14, 2005

(86) PCT No.: PCT/AT2005/000367
§ 371 (c)(1),
(2), (4) Date: Oct. 30, 2007

(87) PCT Pub. No.: WO2006/029432
PCT Pub. Date: Mar. 23, 2006

(65) Prior Publication Data
US 2008/0243387 A1 Oct. 2, 2008

(30) Foreign Application Priority Data
Sep. 15, 2004 (AT) .................................. A 1558/2004

(51) Int. Cl.
*G08G 1/16* (2006.01)
(52) U.S. Cl.
USPC .......................................... 701/301; 700/245
(58) Field of Classification Search
USPC ......... 700/245, 250, 255, 258, 259, 260, 261, 700/247; 701/23, 26, 27, 70, 300, 301, 302
See application file for complete search history.

(56) References Cited

U.S. PATENT DOCUMENTS

| 5,051,735 | A | * | 9/1991 | Furukawa | .......................... 345/7 |
| 5,111,401 | A | * | 5/1992 | Everett et al. | .................... 701/24 |
| 5,249,851 | A | * | 10/1993 | Johnsen | ......................... 303/150 |
| 5,889,476 | A | * | 3/1999 | Schmitz | ......................... 340/903 |
| 5,948,035 | A | * | 9/1999 | Tomita | ............................ 701/70 |

(Continued)

FOREIGN PATENT DOCUMENTS

| DE | 102 26 140 A1 | 1/2004 |
| EP | 0 382 231 B1 | 8/1990 |
| EP | 1 332 841 A2 | 8/2003 |

OTHER PUBLICATIONS

Kelly "A partial Analysis of the High Speed Autonomous Navigation Problem", May 2, 1994, The Robotics Institute Carnegie Mellon University, pp. 1-135.*

(Continued)

*Primary Examiner* — Thomas Black
*Assistant Examiner* — Sze-Hon Kong
(74) *Attorney, Agent, or Firm* — Collard & Roe, P.C.

(57) ABSTRACT

A method for preventing the collision of an obstacle and a part movable along at least two axes, which axes each have a feeder drive, includes the steps of a minimum stopping distance being determined repeatedly at predetermined time intervals from the relative location and speed data of the moving part as a function of the machine and part data required for this purpose and taking the minimum stopping distance as the basis for the collision calculation. The collision calculation is based on at least one component, from the components of the stopping distance that are related to the individual axes, which component is determined from the speed data retrieved in the individual time intervals and varied by a maximum acceleration of the associated feeder drive at least during the retrieval time interval.

6 Claims, 2 Drawing Sheets

(56) References Cited

U.S. PATENT DOCUMENTS

| | | | |
|---|---|---|---|
| 6,278,360 B1* | 8/2001 | Yanagi | 340/436 |
| 6,317,651 B1* | 11/2001 | Gerstenberger et al. | 700/245 |
| 6,327,530 B1* | 12/2001 | Nishimura et al. | 701/96 |
| 6,615,110 B2* | 9/2003 | Matsuo et al. | 700/245 |
| 6,678,582 B2* | 1/2004 | Waled | 700/245 |
| 6,859,731 B2* | 2/2005 | Takafuji et al. | 701/301 |
| 6,889,140 B2* | 5/2005 | Isogai et al. | 701/301 |
| 7,002,452 B2* | 2/2006 | Watanabe et al. | 340/436 |
| 7,086,293 B2* | 8/2006 | Heiligensetzer et al. | 73/795 |
| 7,099,764 B2* | 8/2006 | Seto et al. | 701/70 |
| 7,138,909 B2* | 11/2006 | Winner | 340/438 |
| 7,221,777 B2* | 5/2007 | Nagaoka et al. | 382/104 |
| 7,318,767 B2* | 1/2008 | Simakov et al. | 451/5 |
| 2003/0225479 A1* | 12/2003 | Waled | 700/245 |
| 2004/0193374 A1* | 9/2004 | Hac et al. | 701/301 |
| 2009/0222134 A1* | 9/2009 | Franke et al. | 700/251 |

OTHER PUBLICATIONS

Freund E et al: "Ein Algorithms Zur Kollisionserkunnung Und-Vermeidung Bei Rototernmit Zylinderformigem Arbeitsraum" Robotersysteme, Springer Verlad, Berling DE, vol. 6, No. 1, Mar. 1, 1990 pp. 1-10, XP0000104118 p. 3-p. 7.

Chang C et al: "Collision Avoidance of Two General Robot Manipulators by Minimum Delay Time" IEEE Transactions on Systems, Man and Cybernetics, IEEE Inc. New York, US, vol. 24, No. 3, Mar. 1, 1994, pp. 517-522, XP0000440883 ISSN: 0018-9472.

Nak Young Chong et al: "Coordinated rate control of multiple telerobot systems with time delay" IEEE SMC'99 Conference Proceedings. 1999 IEEE International Conference on Systems, Man, and Cybernetics (CAT. No. 99CH37028) IEEE Piscataway, NJ, USA, vol. 5, 1999, pp. 1123-1128 vol., XP002390297 ISBN: 0-7803-5731-0.

Nak Young Chong et al: "Remote coordinated controls in multiple telerobot cooperation" Proceedings 2000 ICRA. Millennium Conference. IEEE International Conference on Robotics and Automation. Symposia Proceedings (CAT. No. 00CH37065) IEEE Piscataway, NJ, USA, vol. 4, 2000, pp. 3138-3143 vol., XP002390298 ISBN: 0-7803-5886-4.

Feng, D. and Krogh, B. H., "A Robust Satisficing Feedback Strategy for Autonomous Investigation", pp. 379-384, IEEE International Symposium on Intelligent Control, Sep. 26, 1989, Albany, NY.

Fox, D., Burgard, W., and Thrun S., "Controlling Synchro-drive Robots with the Dynamic Window Approach to Collision Avoidance", pp. 1280-1287, Proceedings IROS 96, Nov. 4, 1996, Osaka, Japan (9 pages).

\* cited by examiner

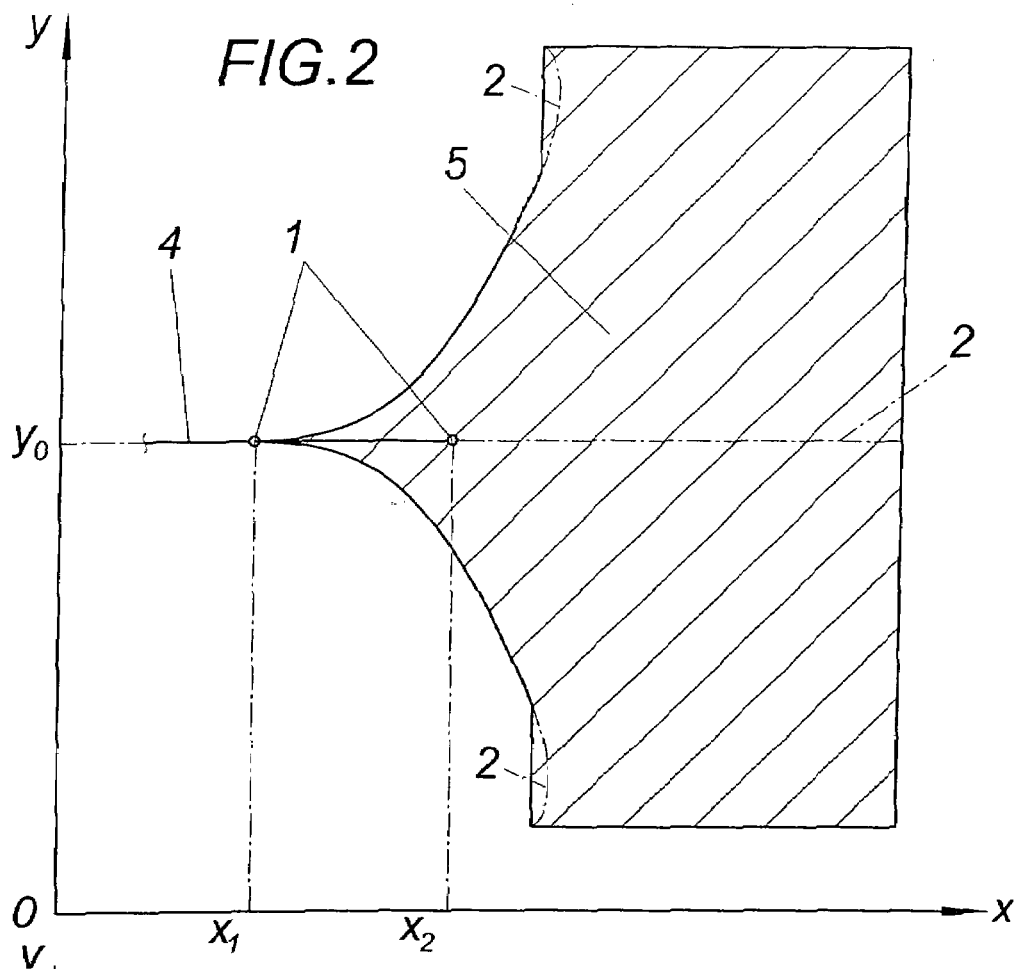
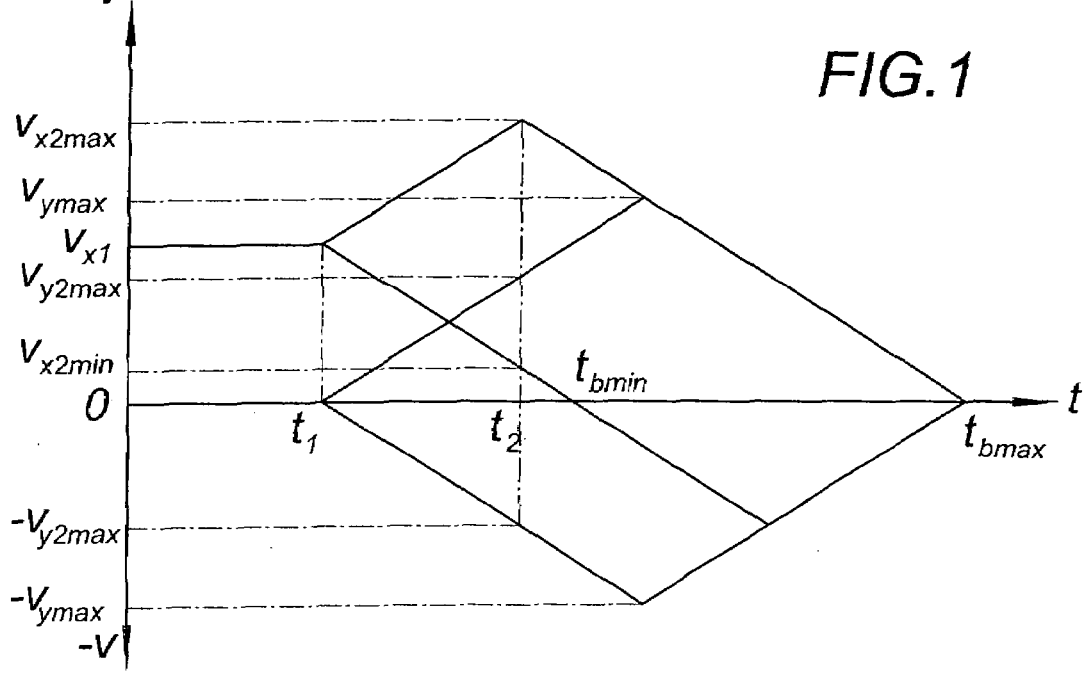

METHOD FOR PREVENTING A COLLISION BETWEEN A PART MOVABLE ALONG AN AXIS AND AN OBSTACLE

CROSS REFERENCE TO RELATED APPLICATIONS

Applicant claims priority under 35 U.S.C. §119 of Austrian Application No. A 1558/2004 filed Sep. 15, 2004. Applicant also claims priority under 35 U.S.C. §365 of PCT/AT2005/000367 filed Sep. 14, 2005. The international application under PCT article 21(2) was not published in English.

FIELD OF THE INVENTION

The invention relates to a method for preventing the collision of a part movable along at least two axes relative to an obstacle, which axes each have a feeder drive, a minimum stopping distance being determined repeatedly at pre-determined time intervals from the relative location and speed data of the moving part as a function of the machine and part data required for this purpose and being taken as the basis for the collision calculation.

DESCRIPTION OF THE PRIOR ART

In order to be able to prevent a movable part from colliding with an obstacle, it is known in accordance with the prior art to monitor the anticipated stopping distance of the moving part or to take this stopping distance as the basis for a collision calculation. It is difficult in this regard to calculate the stopping distance in such a way that it corresponds to the actual stopping distance extending along the path of movement of the part. If this is not the case or is only approximately the case—the part does not move in the expected manner—a collision can be overlooked or else wrongly assumed. A broad region of methods for estimating such a stopping distance are known in this regard from the prior art. DE 10 226 140 A1 thus proposes, for example, estimating the anticipated stopping distance by taking into account the previous path of movement. In other words, it is assumed that the moving part is highly likely to continue to move such as it did in the past. For this purpose, the current and previous location and speed data of the part is retrieved for the stopping distance, and a minimum stopping distance is determined as a function of the machine and part data required for this purpose. The requisite machine and part data includes, for example, the maximum braking acceleration of the respective feed drives on the axes or else the mass of the moving part. A drawback of an estimation of this type based on the previous path of movement is that an unanticipated future movement of the part will result in a false stopping distance being determined, so that the method for preventing a collision is defective.

EP 0 382 231 B1 and EP 1 332 841 A2 disclose methods for preventing a collision according to which position-dependent maximum speeds are prescribed for a moving part. If, at the moment of retrieval, a defined maximum speed is exceeded, then the moving part must be stopped in order to prevent a collision. The maximum speed is obtained from the stopping distance which is determined from the current position of the moving part. In such a calculation, machine data, in particular operating variables of the robot, can also, according to EP 1 332 841 A2, be taken into account. Factors to be considered can include, inter alia, maximum acceleration values in order to incorporate into the stopping distance calculated from the current position the fact that the moving part experienced maximum acceleration prior to its current position. The movement of the part during the collision calculation is disadvantageously disregarded, and this can result in a false stopping distance, so freedom from collision cannot be ensured.

SUMMARY OF THE INVENTION

The object of the invention is therefore to configure a method of the type described at the outset so as to ensure freedom from collision for a moving part. In addition, this method should require low computing power.

The invention achieves the object set in that the collision calculation is based on at least one component, from the components of the stopping distance that are related to the individual axes, which component is determined from the speed data retrieved in the individual time intervals and varied by a maximum acceleration of the associated feeder drive at least during the retrieval time interval.

If the collision calculation is based on at least one component, from the components of the stopping distance that are related to the individual axes, then account is not from the outset taken, as in the prior art, of the overall movement of the part; instead, the initial focus is on the individual axes, these axes being formed, in accordance with the respective feeder drives, between the moving part and the obstacle. Such a focus allows influences on the axes easily to be taken into account, without high computing powers being required for this purpose. In particular, however, this allows for the fact that at least one component is determined from the speed data retrieved in the individual time intervals and varied by a maximum acceleration of the associated feeder drive at least during the retrieval time interval. That is to say, the invention is based on the finding that, starting from a retrieval moment up to the moment of braking, the most extreme movement of the part can be a movement subject to maximum accelerations. This finding can easily be taken into account in the calculation of a stopping distance in that a component of the stopping distance is determined from varied speed data, i.e., for example, from the increased speed data up to the moment of braking and not from current speed data at the moment of retrieval. According to the invention, all possible movements of the part—even the most extreme—are thus taken into account in the collision calculation without a previous movement of the part having to be in any way considered. As this also ensures that the actual movement of the part extends in all cases within the determined stopping distance, a movement of the part can also not be wrongly estimated; in contrast to the prior art, this guarantees freedom from collision at all times.

If the collision calculation of each axis is based on two components of the stopping distance, which two components are determined from the speed data retrieved in the individual time intervals and increased or reduced by a maximum positive acceleration, for the one component, and maximum negative acceleration, for the other component, of the associated feeder drive at least during the retrieval time interval, there can be calculated a stopping region formed from all possible stopping distances of the moving part. That is to say, the various components related to a axis produce, in combination with the other components, stopping distances which can be used for demarcating the stopping region. The moving part cannot in its future movement leave this stopping region, thus ensuring that each further movement of the part is encompassed by the stopping region. This purpose of the collision calculation is then to monitor via these components the stopping region of the moving part.

If at least the location data associated with the time interval following the retrieval time interval is additionally used for the collision calculation, the stopping region can be advantageously reduced. That is to say, the control means usually has at its disposal the future or subsequent location data which can then be used for the collision calculation. There can thus be established a stopping region which corresponds, at least up to these subsequent movement coordinates, to the path of movement, the stopping region extending from these subsequent movement coordinates on account of the then unknown path of movement. A reduced stopping region entails advantages, in particular, for reducing computing effort.

In order to increase tolerance with respect to machine inaccuracies, safety factors can easily be taken into account in the calculation of the components of the stopping distance in that the components of the stopping distance whose values are additionally changed by safety factors are taken as the basis of the collision calculation.

If, in the event of a collision scenario being determined, the braking of the part is initiated at the start of the time interval following the retrieval time interval, then the entire time interval is available for the collision calculation. If, moreover, braking is initiated if the collision calculation has not been completed by the time interval following the retrieval time interval, this can prevent a collision from being overlooked.

In the event of repeated determination of the components of the stopping distance despite the initiation of braking, freedom from collision can, in contrast with the prior art, be detected during braking. Known methods start from a stopping of the part; however, in contrast thereto, the invention is able to detect whether freedom from collision is obtained for the moving part during braking, thus allowing the brake to be released again.

BRIEF DESCRIPTION OF THE DRAWINGS

The drawings illustrate the method according to the invention, by way of example, with reference to assumed location, speed, machine and part data. In the drawings:

FIG. 1 shows the speed data, plotted over a common time axis, of a moving part along two machine axes;

FIG. 2 shows the stopping region, illustrated in simplified form, which is established by the integration of all possible speed data as shown in FIG. 1 and thus includes all possible stopping distances of the moving part.

DESCRIPTION OF THE PREFERRED EMBODIMENT

Figure 3:
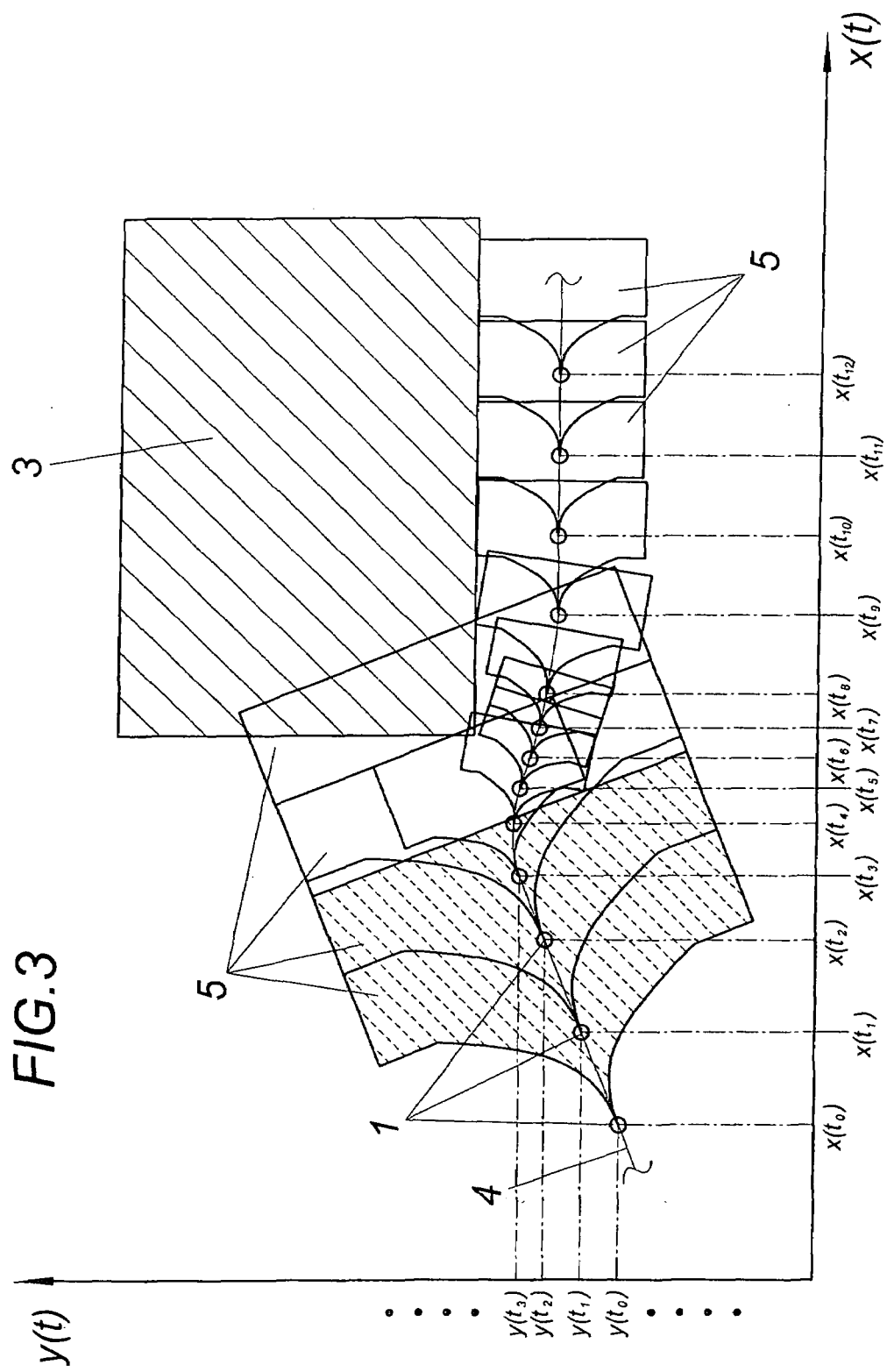
FIG. 3 shows the method according to the invention carried out on the moving part with the stopping regions associated with the respective location data of the moving part.

FIG. 3 shows the method for preventing a collision, by way of example, for a moving part 1 illustrated for the sake of clarity in point form, the moving part 1 being movable along two machine axes x and y via a respective associated feeder drive. For the sake of simplicity, rotatory movements have been dispensed with in the embodiment, so there is no need for further reference to the fact that a part 1 can also be moved along an axis of rotation. At predetermined time intervals, for example between t1 and t2, a minimum stopping distance 2 is repeatedly determined from the location data x(t) and y(t) and the speed data vx(t) and vy(t) of the moving part 1 as a function of the machine and part data required for this purpose. The minimum stopping distance 2 can be seen, in particular, from FIG. 2, wherein it should be added that for the sake of simplicity in the first place only one component of the minimum stopping distance 2 in the direction of the machine axes x is examined. The current speed vx1 of the part 1, the maximum admissible braking acceleration and also the current location data x1 of the part 1 are thus included, for example, in this determination of the stopping distance 2. The collision calculation then has to determine whether an obstacle 3 projects into the minimum stopping distance 2 of the moving part 1.

However, it is peculiarly important that the collision calculation according to the invention takes account of special preconditions when determining the minimum stopping distance.

As may be seen from FIG. 1, the machine axes X has a speed vx1 at the moment t1. The moment t1 is the moment of retrieval of the time interval t1 to t2 for the data for determining the stopping distance 2. At moment t2, braking is initiated, i.e. at a maximum negative acceleration of each feeder drive on the machine axes x. Between the moment of retrieval t1 and the moment of braking t2, account is taken, in accordance with the invention, of the fact that the moving part 1 is subject to maximum acceleration on the path of movement (cf. the increase in speed from vx1 to vx2max). The machine and part data required for this assumption are known. If it is then assumed that the collision monitoring means is not aware of the future path of movement 4 of the part, the assumption of a maximum acceleration of the part 1 in the time interval t1 to t2 allows an estimation of the anticipated path of movement 4 to be dispensed with. This is because the collision monitoring means monitors all movements—including the maximum possible movement—on the machine axis x. For the path of movement 4 of the part 1 can at most vary in accordance with a maximum (positive or negative) acceleration. It is therefore not necessary, with respect to the prior art, to estimate a movement of the part on the basis of a previous movement. The invention thus guarantees freedom from collision, as all possible stopping distances 2 of the moving part 1 are, after all, supplied to the collision calculation.

The invention accordingly proposes that there be established at least one component of the stopping distance that is determined from varied speed data vx(t) or vy(t) of the moving part. In other words, the component of the stopping distance that is related to the machine axis x takes account, inter alia, of braking under an increase in speed from vx1 to vx2max. The fact that this component of the stopping distance 2 also takes account of the movement of the part 1 during the time interval t1 to t2 does not in any way alter the invention. That is to say, the fact that the collision calculation is based on at least one component, from the components of the stopping distance 2 that are related to the individual axes, which component is determined from the speed data vx(t) or vy(t) retrieved in the individual time intervals and varied by a maximum acceleration of the associated feeder drive at least during the retrieval time interval (t1 to t2, etc.). The collision calculation is therefore, in accordance with the invention, based on a stopping distance 2 also including the stopping distance unknown by the future path of movement of the collision calculation. Although there are constructionally conditioned speed limits, this does not restrict the invention, for in this case the speed on the respective axis has merely to be restricted—further acceleration of the respective machine axis x or y is thus not possible. The collision calculation therefore has at its disposal a stopping distance 2 in the x direction that includes all future path-specific stopping distances. Complete freedom from collision can thus be ensured with respect to the prior art, as false estimation of the stopping distance 2 cannot occur regardless of the properties of the future path of movement 4 of the part 1.

In the event of a movement taking place in a plurality of machine shafts x and y, a stopping region 5 must be considered, this stopping region 5 being formed from the possible stopping distances 2 of the moving part 1 at the moment of retrieval t1. There are accordingly determined for each machine axis x or y two related components of the stopping distance 2, i.e., on the one hand, a component assuming a maximum positive acceleration of the associated feeder drive from the moment of retrieval t1 to the moment of braking t2 (vx1 to vx2max) and, on the other hand, another component assuming maximum negative acceleration of the associated feeder drive from the moment of retrieval t1 to the moment of braking t2 (vx1 to vx2max). The combination of the resultant components related to the various machine axes x and y thus allows the demarcation of the stopping region 5. For example, there is obtained a funnel-shaped stopping region 5 including all possible stopping distances 2. In the event of a machine axis x or y, in particular the x axis, carrying out a path-defined maximum negative acceleration (vx1 to vx2max), this maximum braking with an identical rise then ensues at moment t2 (FIG. 1). At moment tbmin, the machine axis x then comes to a halt. FIG. 1 also shows that even when a machine axis x or y, in particular the y axis, comes to a halt, from the moment of retrieval t1 an acceleration from 0 to vy2max to −vy2max can take place. FIG. 1 also shows that, for example, in the event of maximum braking of the one machine axis x, the other machine axis y is further accelerated (cf. vy2max to vymax) until the speeds are eventually identical |vx(t)|=|vy(t)|, after which both machine axes x and y are braked synchronously. Thus, for example, at moment tbmax or else at moment tbmin, both machine axes x and y come to a halt simultaneously. This is based on the assumption, for example, that it is possible for both machine axes x and y to apply identical accelerations. Integrating the speeds vx(t) and vy(t) then allows the stopping region 5 to be established as shown in FIG. 2, this stopping region 5 having been shown in simplified form.

It should be noted that a stopping region 5 is determined by the speed distribution of the machine axes x and y. The path of movement can thus give rise to differingly formed stopping regions 5, use being made in FIG. 3, in simplified form, of a stopping region 5 incorporating the various stopping regions. If such a determined stopping region 5 is then applied to the path of movement 4 (FIG. 3), it is thus detected that at the moment of retrieval t0 there is not yet any collision with the obstacle 3, i.e. the movement can be pursued in accordance with the predetermined path of movement 4. However, at moment t1, a collision with an obstacle 3 is possible, i.e. in that the associated stopping region 5 overlaps with the obstacle 3. At moment t2, there is initiated a braking with maximum negative acceleration; however, the stopping region 5 computed at moment t2 continues to overlap the obstacle 3, as up to moment t2 no braking took place on account of the predetermined path of movement 4. Maximum braking up to moment t3 also then results in a correspondingly reduced stopping region 5 corresponding to the end edge of the stopping region 5 at moment t2. There is a continued risk of collision, as the future path of movement 4 of the collision calculation is after all not known, so the braking of the part 1 has to be maintained. At moment t4, the defined path of movement 4 leads away from the obstacle 3, as a result of which the braking-reduced stopping region 5 also veers off. However, a collision is still possible at moment t4, so the braking of the moving part 1 is continued on the path of movement 4.

As, after the initiation of braking, the components of the stopping distance 2 are repeatedly determined, freedom from collision can be detected at moment t5, so, for example from moment t8, the brake can, after the initiation of braking, be released again, as freedom from collision has been known since t5. Acceleration on the path of movement 4 can thus take place, although only until a further collision is determined. There is thus eventually set a speed of the part 1 on the path of movement 4 that is just high enough to ensure freedom from collision. According to the invention, the moving part 1 is therefore stopped only if absolutely necessary.

In order to reduce the surface area of a stopping region 5, it is advantageous to use the location data x(t) or y(t) associated with the time interval (t2 to t3, etc.) following the retrieval time interval (t1 to t2, etc.) for calculating the components. For the control means is usually aware of the future location data x2 and y2 for the subsequent point of the path of movement 4 to be traced. The stopping region 5 is therefore unknown merely from moment t2, although this has not been illustrated in detail. Safety factors can also be incorporated into the components of the stopping distance 2 to allow for any machine inaccuracies. As this merely entails an enlargement of the stopping region 5, it has not been illustrated. Braking of the part 1 at the start of the time interval (t2 to t3, etc.) following the retrieval time interval (t1 to t2, etc.) also rules out the possibility of a collision being overlooked if the collision calculation has not been completed, and this has also not been illustrated in detail.

The invention claimed is:

1. A method for preventing the collision of an obstacle by a part movable along at least two axes of a machine, each axis of the at least two axes having a feeder drive, the method comprising steps of:
    retrieving speed data of the part at a moment of retrieval during an individual predetermined time interval to obtain retrieved speed data,
    varying the retrieved speed data via a maximum acceleration of the associated feeder drive at least during the individual predetermined time interval to obtain varied speed data,
    repeatedly determining a minimum stopping distance at individual predetermined time intervals using relative location data and the speed data of the part as a function of the machine and of part data, the minimum stopping distance having components related to an individual axis,
    wherein at least one component of the components of the minimum stopping distance is determined from the varied speed data instead of from the retrieved speed data, and
    performing a collision calculation using the minimum stopping distance.

2. The method for preventing a collision as claimed in claim 1, wherein the collision calculation establishes a stopping region formed by possible minimum stopping distances of the part for each axis on the basis of two components,
    wherein the first component of the two components takes braking into account and is increased by a maximum positive acceleration of the associated feeder drive at least during the individual predetermined time interval where the speed data is retrieved, and
    wherein the second component of the two components takes braking into account and is reduced by a maximum negative acceleration of the associated feeder drive at least during the individual predetermined time interval where the speed data is retrieved.

3. The method for preventing a collision as claimed in claim 1, wherein for reducing a stopping region, at least location data associated with a time interval following the individual predetermined time interval where the speed data is retrieved is used and the collision calculation is based on the location data associated with the time interval following the individual predetermined time interval.

4. The method for preventing a collision as claimed in claim 1, wherein the at least one component has a value additionally changed by a safety factor.

5. The method for preventing a collision as claimed in claim 1, wherein the braking of the part is initiated at a start of a time interval following the individual predetermined time interval where the speed data is retrieved if either a collision scenario is determined or the collision calculation has not been completed by the start of the time interval following the individual predetermined time interval where the speed data is retrieved.

6. The method for preventing a collision as claimed in claim 5, wherein after the initiation of the braking, the repeated determination of the components of the stopping distance is continued and is taken as the basis for the collision monitoring, and wherein a brake is released with a freedom from collision determined by the repeated determination.

* * * * *

UNITED STATES PATENT AND TRADEMARK OFFICE
CERTIFICATE OF CORRECTION

PATENT NO. : 8,577,591 B2
APPLICATION NO. : 11/662566
DATED : November 5, 2013
INVENTOR(S) : Christoph Schinerl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1526 days.

Signed and Sealed this
Twenty-second Day of September, 2015

Michelle K. Lee
*Director of the United States Patent and Trademark Office*